Oct. 25, 1966 H. C. BUNTSCHUH 3,281,746
COMPACT MULTIPLE POLE PAIR RESOLVER
Filed Jan. 25, 1963 2 Sheets-Sheet 1
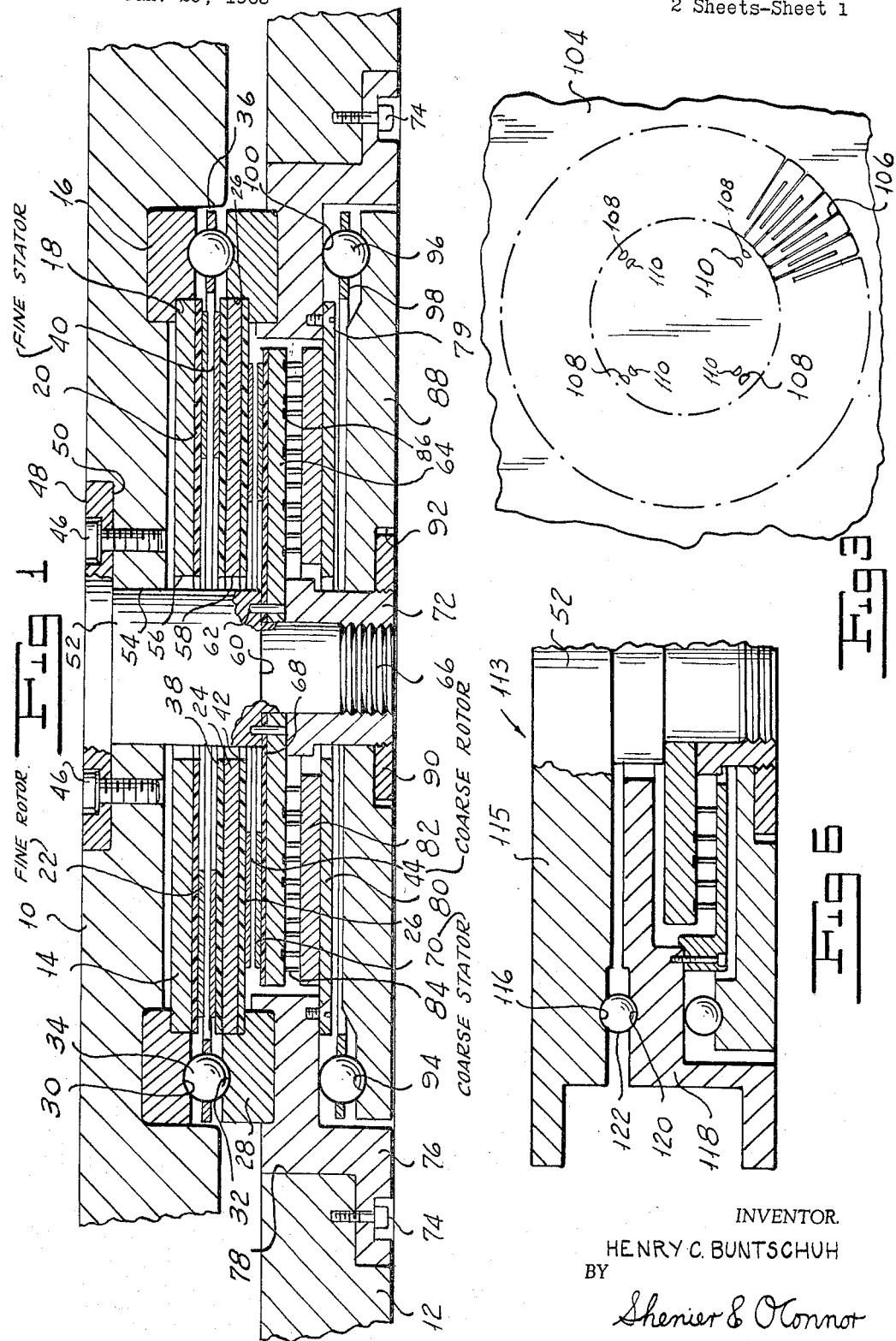
INVENTOR.
HENRY C. BUNTSCHUH
BY
Shenier & O'Connor
ATTORNEYS

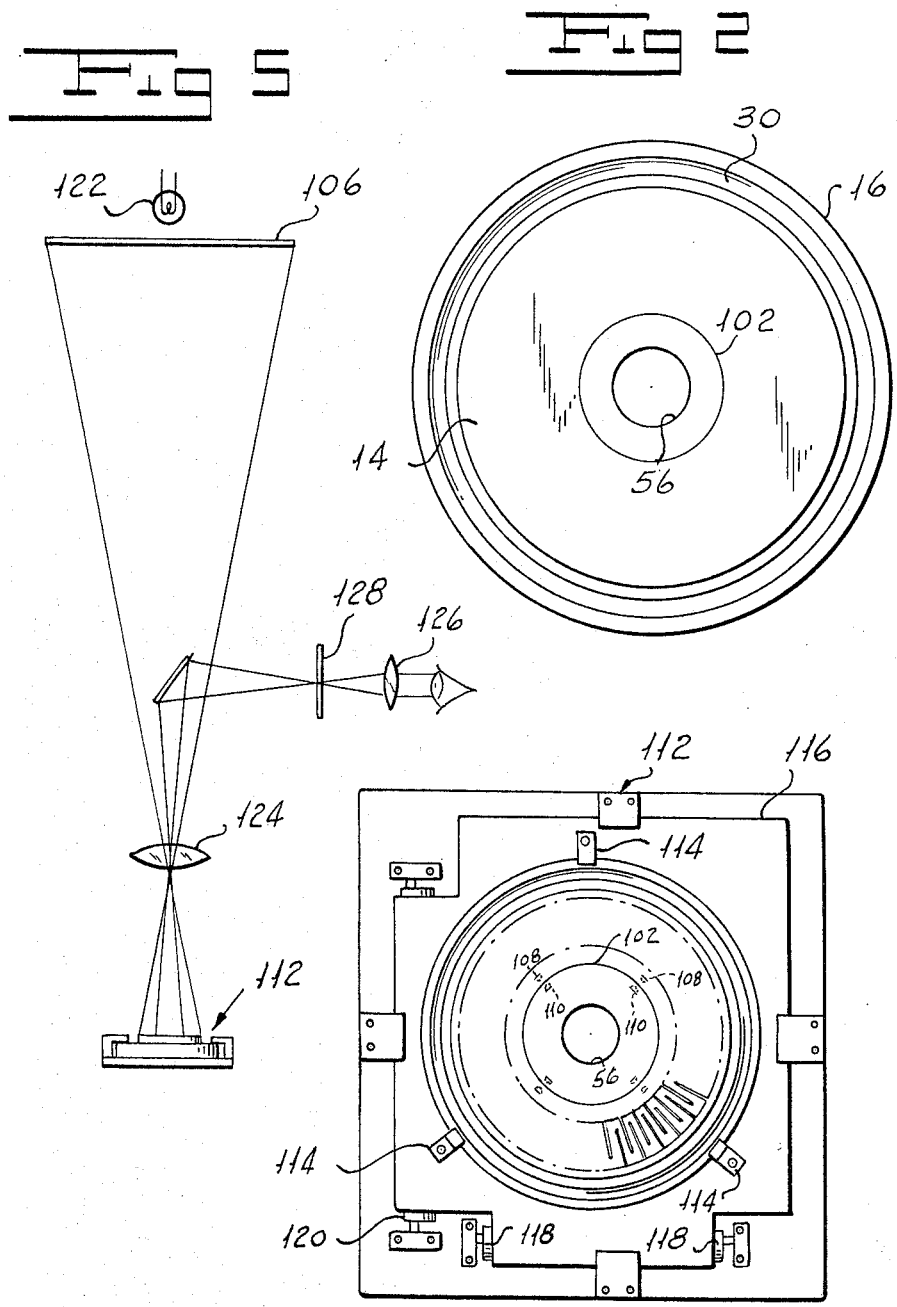

United States Patent Office 3,281,746
Patented Oct. 25, 1966

3,281,746
COMPACT MULTIPLE POLE PAIR RESOLVER
Henry C. Buntschuh, New Hyde Park, N.Y., assignor to United Aircraft Corporation, East Hartford, Conn., a corporation of Delaware
Filed Jan. 25, 1963, Ser. No. 253,932
5 Claims. (Cl. 336—123)

My invention relates to a multiple pole pair resolver and more particularly to an improved multiple pole pair resolver which is compact and which is adapted to carry relatively large loads.

There are known in the prior art resolvers having multiple pole pairs for producing an electrical signal indicating the relative rotary displacement between a pair of members. One form of this device includes conductive patterns deposited on glass plates which are mounted for relative rotation. When the patterns are connected and energized they produce an output signal representative of the relative rotary displacement of the two plates. These devices are manufactured and sold under the name "Inductosyn" which is a registered trademark of the Inductosyn Corporation for position data producing devices of this type. These devices are hereinafter identified by the term "Inductosyn." One type is shown and described in United States Patent No. 2,614,171, issued October 14, 1952, to L. Fein for Electrical Apparatus for Measuring Angles.

In the prior art the bearings are inside the patterns, usually in the central openings of the plates. In many applications of Inductosyns the equipment is subject to heavy gravity loads with a constant heavy load on the bearings. In prior art installations where such heavy loads are anticipated conventional bearings are employed in preloaded duplex pairs. While this arrangement can absorb the heavy loads incident to operation of the equipment the installation is so wide as to be highly undesirable particularly where size and weight are of prime importance.

Owing to the fact that patterns of Inductosyns of the prior art are deposited on glass plates there are unequal coefficients of expansion between these plates and the bearings which support the plates for relative rotation. Consequently the accuracy of the output may be affected by temperature change.

Since the Inductosyn is a high precision device which derives its accuracy from the precision and stability of the engraved circuit patterns on the plates it is essential that the rotor and stator plates be installed with a high degree of concentricity. Mounting flanges and adjustable centering means are employed in the prior art to insure concentricity between the rotor and the stator. These adjustable means not only add to the difficulty of installing the device but also they add to the bulk and weight of the assembly.

I have invented a multiple pole pair resolver or Inductosyn which overcomes the defects of devices of the prior art pointed out above. My Inductosyn is adapted to withstand heavy loads while at the same time being compact. The accuracy of my device is not affected by changes in temperature. My Inductosyn does not require the use of auxiliary adjusting means for insuring that the rotor and stator are centered when the device is installed.

One object of my invention is to provide an Inductosyn which is adapted to carry relatively large loads while at the same time being compact.

Another object of my invention is to provide an improved multiple pole pair resolver which overcomes the defects of similar devices of the prior art.

A further object of my invention is to provide an improved rotating electrical device the accuracy of which is not affected by changes in temperature.

A still further object of my invention is to provide an Inductosyn which does not require the use of auxiliary centering means for its proper installation.

Other and further objects of my invention will appear from the following description.

In general my invention contemplates the provision of a multiple pole pair resolver in which an axial thrust bearing disposed radially outwardly of the conductive patterns on the pattern carrying members mounts these members for relative rotation. I form the pattern carrying members of the same material as that providing the bearing races. I apply the conductive patterns to the members in such a way as to insure that the patterns are concentric with the bearing races.

In the accompanying drawings which form part of the instant specification and which are to be read in conjunction therewith and in which like reference numerals are used to indicate like parts in the various views:

FIGURE 1 is a sectional view illustrating one form of my compact Inductosyn.

FIGURE 2 is a plan view of the high speed rotor and and associated bearing ring of my compact Inductosyn before the pattern is applied thereto.

FIGURE 3 is a plan view of the template showing the pattern to be applied to the rotor shown in FIGURE 2.

FIGURE 4 is a plan view illustrating the high speed rotor and associated race assembled in a fixture during the application of the pattern thereto.

FIGURE 5 is a schematic view of the optical system I employ to apply the pattern to the rotor shown in FIGURE 2.

FIGURE 6 is a fragmentary sectional view of an alternate form of my compact resolver.

Referring now to FIGURE 1 of the drawings one use of my compact resolver is to provide an electrical signal indicating the relative rotary displacement of an inner gimbal ring 10 and an outer gimbal ring 12. The form of my compact resolver illustrated in FIGURE 1 includes a high speed or fine output rotor plate 14 which I form of the same material such as steel as that of which the inner gimbal bearing ring 16 of this form of my invention is made. Plate 14 is mounted in an annular recess 18 formed in the inside of the ring 16. In a manner which will be described hereinafter I first apply an insulating film 20 to the surface of rotor plate 14 and then apply the conductive rotor pattern 22 to the surface of the insulating film 20. It will readily be appreciated that the conductive pattern 22 has the configuration required for the high speed rotor of the Inductosyn.

I mount a second plate 24 in an annular recess 26 of the other outer gimbal bearing ring 28. The respective rings 16 and 28 have raceways or grooves 30 and 32 for receiving balls 34 held in spaced relationship by a retainer 36. I apply an insulating film 38 to the surface of the ring 24 which faces the surface of ring 14 which carries the high speed rotor conductive pattern 22. After having applied the insulating film 38 to plate 24 I then form the high speed stator conductive pattern 40 over the insulating film.

The other face of the plate 24 carries an insulating film 42 which receives the slow speed or coarse rotor conductive pattern 44 of the Inductosyn. Respective screws 46 secure a shaft flange 48 in a recess 50 in the inner ring 10. The shaft 52 which carries the flange 48 extends through an opening 54 in the inner ring and through openings 56 and 58 in the plates 14 and 24. I form the shaft 52 with a shoulder 60. Pins 62 locate the coarse output stator plate 64 in position on the reduced portion 66 of shaft 52. Plate 64 carries an insulating film 68 over which I apply the coarse stator pattern 70 of this form of my Inductosyn. I thread a collar 72 onto the end of shaft portion 66 to hold the plate 64 firmly into engagement with the shoulder 60.

Screws 74 secure the outer gimbal bearing ring support 76 in an opening 78 in the outer gimbal 12. I employ any suitable means such as screws 78 for securing a support plate 80 to the bearing support 76. Plate 80 carries a brush holder 82 having brushes 84 which engage sliprings 86 on the plate 64. It will readily be appreciated that channels and passages and the like are provided for the required leads. Moreover the plate 64 is so constructed as to permit the insertion of leads. Since the details of these arrangements do not per se form part of my invention they will not be described in detail. After having assembled the parts thus far described in the manner outlined above I then assemble a locking plate 88 over the sleeve 72 by means of a locking nut 90 disposed in a recess 92 in the locking plate. I form a bearing groove or race 94 in the outer periphery of the plate 88 for the reception of balls 96 held in position by a retainer 98. It will readily be seen that the support 76 forms a flat race 100 for the balls 96. This provides some freedom of motion to account for slight eccentricity in respect of the main bearing.

As has been pointed out hereinabove it is essential that the respective patterns 22 and 40 of the high speed or fine read-out members of the Inductosyn be precisely centered with reference to each other. Referring now to FIGURES 2 to 5 I have shown one method by which I insure that these patterns are precisely centered. In the course of applying the pattern 22 to the insulating film 20 on the plate 14, for example, before the groove 30 in the bearing ring 16 is finished I assemble the plate 14 in the recess 18 of the bearing ring with a press fit. This operation is performed after hardening of the ring 16. As has been pointed out hereinabove I form the plate 14 from the same material such as steel of which the ring 16 is formed. When this has been done I place the subassembly in a chuck for finish grinding of race 30. With the assembly in the same chuck I face off the plate 14 to eliminate any possible wobble of the face and to obtain the desired clearance between the opposite faces. I thus insure that the patterns are parallel. Concomitantly with the performance of these operations I scribe a circle 102 on the plate 14 adjacent to opening 56. It will readily be apparent that since the operations of finishing the race 30 and of scribing the circle 102 are performed at the same time the scribed circle 102 is concentric with the groove on race 30.

When the operations just described have been completed I apply the coating of insulating material 20 to the face of the plate 14. Next I plate conductive material over the surface of insulating film 20. When this has been done a coating of photosensitive material is applied over the plated conductive material. I accomplish these operations in such manner that the scribed circle 102 is still visible.

Referring to FIGURE 3 I have shown a template or mask 104. The template or mask 104 is formed from an opaque material and is cut out to form a pattern 106 through which light can pass. Moreover, I provide the mask with a plurality of pairs of openings 108 and 110 which are so arranged as to bracket an imaginary circle on the mask which is concentric with the pattern 106. For purposes of clarity in exposition I have not shown the true proportions of the reference circle 102 and marks 108 and 110 in respective FIGURES 2 to 5.

Referring now to FIGURE 4, preparatory to applying the pattern to the film 20 on the plate 14 I assemble the pattern to the film 20 on the plate 14 I assemble the plate and the bearing ring 16 on a device indicated generally by the reference character 112 adapted to be actuated to position the plate 14 in a plane. Since the details of this device 112 do not themselves form part of my invention I will not describe the device in detail. A centering device of this nature is shown and described in copending application Serial No. 806,644 filed April 15, 1959, by Jean A. Duvoisin, now Patent No. 3,074,177 issued January 22, 1963. I employ clamps 114 for holding the subassembly of plate 14 and ring 16 on the movable plate 116 of the device. An eccentric 118 can be turned to position the plate 116 along one axis. A second eccentric 120 is adapted to be turned to position the plate 116 along a second axis perpendicular to the first.

After the subassembly of the ring 30 and the plate 14 carrying insulation 20, a conductive film and a photosensitive film have been assembled on the device 112 then with the photosensitve material covered and with the scribed circle 102 exposed I position the device at a location such as is illustrated in FIGURE 5 at which an image of the pattern can be focused thereon by means of a light source 122 projecting light through the mask 106 and a lens 124 onto the surface of the plate 114. I provide a lens 126, a slit-forming member 128 and a mirror 130 which permit the image focused on the plate 14 to be viewed by an observer. When this has been done, I manipulate the eccentrics 118 and 120 until the plate has been so positioned that the pairs of light spots corresponding to openings 108 and 110 bracket the reference circle 102 as shown in FIGURE 4. With this condition existing I know that the image of the pattern 106 is concentric with the race 30. I then expose the photosensitive material to form a resist pattern corresponding to the pattern it is desired to apply to the plate 14. Next the unexposed material is washed away and the plating is etched with a suitable etchant. All areas other than those covered with the resist are etched away to leave the desired conductive pattern. Any suitable means can then be employed to remove the resist which covers the conductive pattern. Since the details of this etching process do not per se form part of my invention I will not describe them in detail. When I have applied the high speed or fine read-out rotor pattern to the plate 14 in the manner described I then apply the high speed pattern 40 to the plate 24 in a similar manner so that it is concentric with the race 32 in bearing ring 28. I may also etch the low speed pattern on the appropriate surfaces. It will readily be appreciated, however, that this section of my device does not require the high degree of accuracy necessary in the fine read-out section.

Referring now to FIGURE 6 I have shown a modified form of my compact resolver in which the same parts as those shown in FIGURE 1 are identified by the same reference characters. The distinguishing feature of this form of my invention indicated generally by the reference character 113 is that I form a plate 115 integral with the shaft 52 and I cut the raceway 116 for the high speed or fine read-out bearing directly in the plate. This form of my invention includes a follow-plate 118 having a raceway 120 cut therein to permit balls 122 to be disposed in raceways 116 and 120 to mount the elements for relative rotation. The patterns for the high speed section of my device can be applied to the opposing faces of the follow-plate 118 and the base plate 115 in the manner described hereinabove in connection with FIGURE 1. The remaining parts of the form of my invention shown in FIGURE 6 are substantially the same as the corresponding parts illustrated in FIGURE 1.

In use of my resolver, for example, to produce an electrical signal indicating the relative angular position of the inner gimbal ring 10 with respect to the outer gimbal ring 12, the low speed or coarse read-out rotor pattern 44 and stator pattern 70 are energized so that the ouput signal produced thereby goes through a complete electrical cycle in the course of one revolution of shaft 52. I so construct the high speed stator pattern 40 and the high speed rotor pattern 22 as to cause the electrical output produced by this fine read-out or high speed section of the device to go through a predetermined number of electrical cycles for each revolution of shaft 52. For example, I may arrange these patterns to produce an output signal which goes through 360 complete electrical cycles in the course of a revolution of shaft 52. Thus for each degree of relative movement of ring 10 with reference to ring 12, the output of the high speed section goes through one complete cycle. With this arrangement in any relative position of the ring 10 with respect to the ring 12, the coarse output section produces a signal indicating relative angular position in complete degrees while the fine read-out section produces a signal indicating fractions of a degree. These signals can be used in any way known to the art such as to provide inputs to a suitable computer. Owing to the arrangement of my device, the outputs are not appreciably affected by high gravity forces in the direction of the axis of shaft 52. Moreover, since I form the pattern support plates from the same material as the bearings of the resolver, the output is not affected to any appreciable degree by changes in temperature. Owing to the manner in which I construct my resolver, it does not require auxiliary centering means.

It will be seen that I have accomplished the objects of my invention. I have provided a compact multiple pole resolver which is adapted to carry relatively large loads. My resolver overcomes the defects of resolvers of the prior art constructed to carry heavy loads. The accuracy of my device is not affected appreciably by changes in temperature. It does not require auxiliary centering means for its proper installation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A resolver including in combination a first support plate, a second support plate, means mounting said support plates in spaced relationship, a third support plate disposed between said first and second support plates to provide a first pair of opposed plate faces on said first plate and on said third plate and a second pair of opposed plate faces on said second plate and on said third plate, means comprising an axial thrust bearing for mounting said first and second support plate mounting means and said third plate for relative rotary movement, said axial thrust bearing surrounding said plates, means comprising a fine input winding and a fine output winding carried respectively by the faces of said first pair for producing a fine output signal representing the fine relative angular position of said third plate with respect to said first and second plates and means comprising a coarse input winding and a coarse output winding carried respectively by the faces of said second pair for producing a signal indicating the coarse relative angular position of said third plate with respect to said first and second plates.

2. A device for producing an electrical signal indicative of the relative angular position of a pair of members including in combination a first member providing a first generally planar surface, a first plate providing a second generally planar surface, means mounting said plate on said first member with said second surface facing said first surface in spaced relation thereto, a second member, a second plate carried by said second member, said second plate having third and fourth generally planar surfaces, first generally circularly disposed cooperating windings on said first and third surfaces, second generally circularly disposed cooperating windings on said second and fourth surfaces, an axial thrust bearing comprising raceways on said first and second members, said raceways being disposed radially outwardly of said windings at the same radius and said raceways being concentric and rolling elements in said raceways.

3. A device as in claim 2 wherein said means mounting said first plate on said first member comprises a shaft, said second plate being disposed between said first member and said first plate, said second plate having an opening through which said shaft extends.

4. A device as in claim 2 in which said means mounting said first plate on said first member comprises a shaft and including a second axial thrust bearing between said shaft and said second member, said second thrust bearing comprising a raceway disposed radially outwardly of said windings, a planar surface facing said raceway and rolling elements in said raceway and contacting said surface.

5. A device as in claim 2 including brush means, and means mounting said brush means on said first member at a spaced location therefrom greater than the spacing of said first plate from said first member.

References Cited by the Examiner
UNITED STATES PATENTS

| | | | |
|---|---|---|---|
| 2,256,406 | 9/1941 | Muir | 340—199 |
| 2,402,603 | 6/1946 | Clark | 340—200 |
| 2,650,352 | 8/1953 | Childs | 340—196 |
| 2,671,892 | 3/1954 | Childs | 340—345 |
| 2,900,612 | 8/1959 | Tripp | 340—196 |
| 2,964,721 | 12/1960 | Tripp | 340—196 |

NEIL C. READ, *Primary Examiner.*

THOMAS B. HABECKER, *Examiner.*